US008837586B2

(12) United States Patent
Begen et al.

(10) Patent No.: US 8,837,586 B2
(45) Date of Patent: Sep. 16, 2014

(54) BANDWIDTH-FRIENDLY REPRESENTATION SWITCHING IN ADAPTIVE STREAMING

(75) Inventors: Ali C. Begen, London (CA); Wilson Chung, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 346 days.

(21) Appl. No.: 13/269,728

(22) Filed: Oct. 10, 2011

(65) Prior Publication Data

US 2013/0089142 A1     Apr. 11, 2013

(51) Int. Cl.
*H04N 21/845* (2011.01)
*H04N 21/234* (2011.01)
*H04N 21/262* (2011.01)

(52) U.S. Cl.
CPC ..... *H04N 21/23424* (2013.01); *H04N 21/8456* (2013.01); *H04N 21/26258* (2013.01)
USPC ..................................................... 375/240.12

(58) Field of Classification Search
CPC ............................................... H04N 21/23424

USPC .................. 375/240, 240.01, 240.26, 240.12; 709/231

See application file for complete search history.

(56) References Cited

U.S. PATENT DOCUMENTS

| 8,386,630 B1* | 2/2013 | Atzmon ........................ 709/231 |
| 2005/0058207 A1* | 3/2005 | Magee et al. ............ 375/240.26 |
| 2010/0322302 A1* | 12/2010 | Rodriguez et al. ....... 375/240.01 |

* cited by examiner

*Primary Examiner* — Dave Czekaj
*Assistant Examiner* — Berteau Joisil
(74) *Attorney, Agent, or Firm* — Merchant & Gould

(57) ABSTRACT

Plural representations of a video stream may be provided. The plural representations may comprise a first chunk, a second chunk, and a transition chunk. The first chunk may comprise a first bitrate and the second chunk may comprise a second bitrate. The first and second chunks may be in decode order starting with an instantaneous decoding refresh (IDR) frame. The transition chunk may be in decode order starting with a non-IDR frame. Next, a request to transition from the first chunk to the second chunk may be received. Then a transition from the first chunk to the transition chunk responsive to the request may occur and the transition chunk may then be provided to another device.

18 Claims, 7 Drawing Sheets

BANDWIDTH-FRIENDLY REPRESENTATION SWITCHING IN ADAPTIVE STREAMING

TECHNICAL FIELD

The present disclosure is generally related to adaptive streaming in computer networks.

BACKGROUND

Transmission of media content (e.g., video, audio, and/or data, etc., collectively or individually referred to herein also as content) between different nodes on a network may be performed in a variety of ways. The type of content that is the subject of the transfer and the underlying network conditions usually determine the methods used for communication. For instance, for a simple file transfer over a lossy network, one emphasis is on reliable delivery. The packets may be protected against losses with added redundancy or the lost packets may be recovered by retransmissions. In the case of audio/video content delivery with real-time viewing requirements, one emphasis is on low latency and efficient transmission to enable the best possible viewing experience, where occasional losses may be tolerated.

The structure of the packets and the algorithms used for real-time content transmission on a given network may collectively define a chosen content streaming protocol. Although various content streaming protocols available today differ in implementation details, they can generally be classified into two main categories: push-based protocols and pull-based protocols. In push-based streaming protocols, once a connection is established between a server (e.g., server device or server software) and a client (e.g., client device or client software), the server remains active on the session and streams packets to the client until the session is torn down or interrupted for example by a client pausing or skipping in the content. In pull-based streaming protocols, the client is the active entity that requests the content from the server. Thus, the server response depends on the client request, where otherwise the server is idle or blocked for that client. Further, the bitrate at which the client wishes to receive the content is entirely determined by the client. The actual rate of reception depends on client's capabilities, load on the server and the available network bandwidth. As the primary download protocol of the Internet, HTTP is a common communication protocol upon which pull-based content delivery is based.

In pull-based adaptive streaming, the client makes a decision about which specific representation of any given content it will request next from a server, where each representation may be received at the client in the form of a plurality of requested chunks (piece of content, where a chunk may be one or more Groups of Pictures (GoP) as known in MPEG-compatible systems, or a "fragment" in MPEG-4 systems, or other suitable sub-divisions of an entire instance of content, also can be called a fragment or a segment). Such a decision may be based on various parameters and/or observations, including the current (observed/available) bandwidth and the amount of data currently residing in a client buffer. Throughout the duration of a given viewing experience, the client may upshift or downshift (e.g., switch to a representation using a higher or lower bitrate) or stay at the same bitrate based on the available bandwidth and buffer conditions, among other factors. However, sometimes transitions in bitrate cause further delays due to certain conditions, such as reduced bandwidth.

Adaptive streaming (e.g., adaptive video streaming) generally structures a content stream as a multi-dimensional array of content chunks. A chunk represents temporal slices of the content (e.g., 2-10 seconds in duration), which has been encoded or otherwise processed to produce differing levels of quality, different resolutions, etc., and in particular, has different sizes requiring different amounts of bandwidth to deliver to one or more client devices. Virtually all current adaptive streaming systems today use a two-dimensional matrix, with one dimension consisting of the time, and the other dimension consisting of (target) encoding rate. In addition, current adaptive streaming systems use a variety of storage structures for the content, such as directories with individual files for each chunk, fragmented MPEG-4 files (e.g., a standardized file format), or custom packaging schemes. The structure of the content matrix, along with associated metadata describing each chunk, is contained in a separate structure, generally referred to as a manifest. The manifests are typically divided into representations each of which describes one row of the content matrix (e.g., all the chunks encoded at a bitrate X). There exist various schemes and emerging standards for the manifests.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

Figure 1:
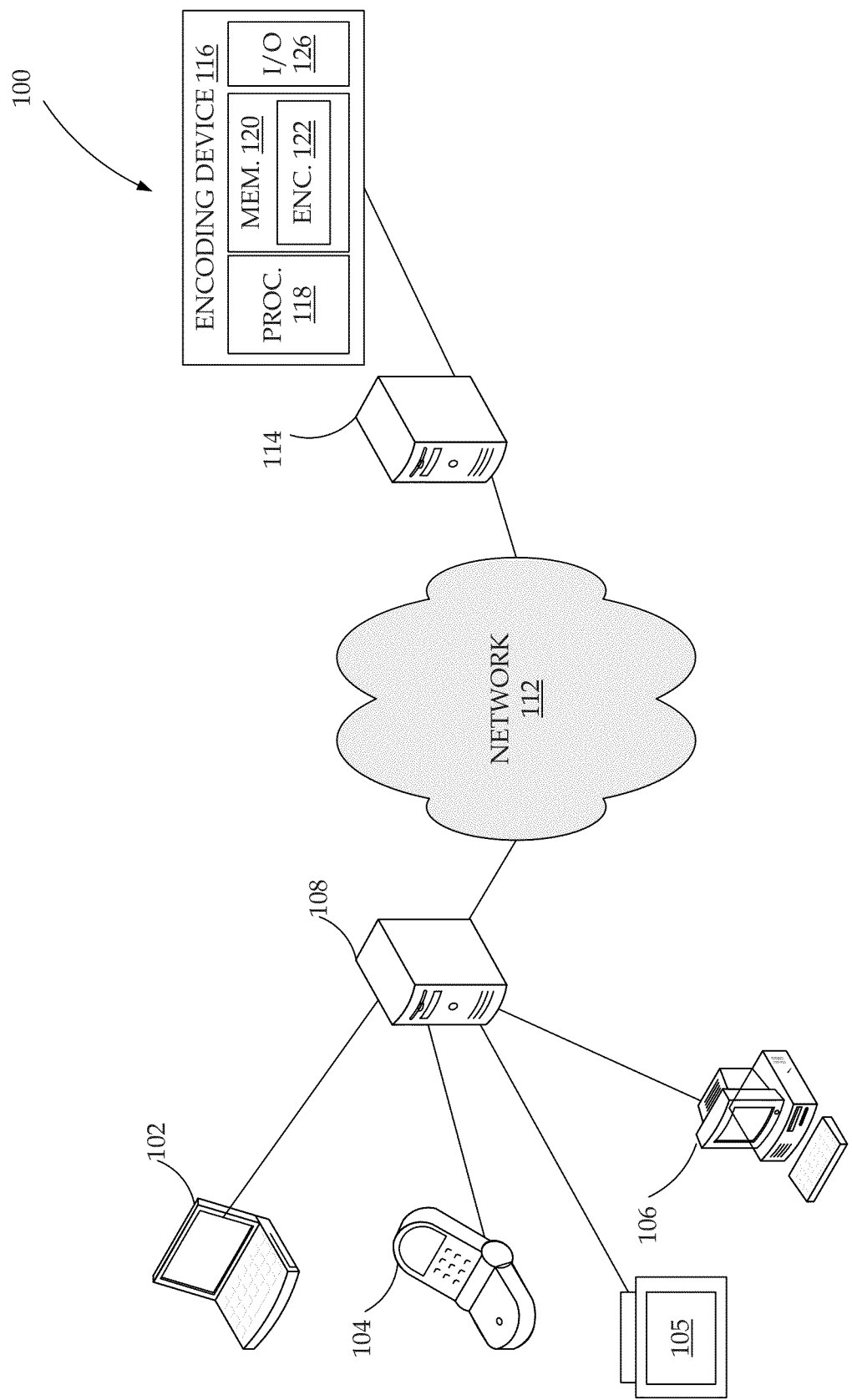
FIG. 1 is a block diagram that illustrates an example environment in which adaptive streaming systems and methods may be implemented.

In one embodiment, a method that provides plural representations of a video stream, wherein the plural representations comprise a first chunk, a second chunk, and a transition chunk, the first chunk comprising a first bitrate and the second chunk comprising a second bitrate, the first and second chunks beginning in decode order with, for example, an instantaneous decoding refresh (IDR) frame and the transition chunk beginning in decode order with a non-IDR frame; receives a request to transition from the first chunk to the second chunk; transitions from the first chunk to the transition chunk responsive to the request; and provides the transition chunk to another device.

Example Embodiments

Disclosed herein are various embodiments of adaptive streaming systems and methods that use non-instantaneous decoding refresh (IDR) frames (e.g., predictive frames) at the start of chunks. For instance, in addition to providing self-decodable chunks that start (e.g., in decoding order) with an IDR frame, a switching or transition chunk (used interchangeably herein) is provided that begins with a non-IDR frame that in one embodiment is predictively encoded based on frames of the previous chunk.

Digressing briefly, in current, common adaptive streaming implementations, the chunks start with an IDR frame (or an I-frame in MPEG-2). In other words, these chunks are independently decodable, making the transition between different representations easier in the sense that the client may perform transitions between different representations that are often encoded at different bitrates. However, in some circumstances, such as low bandwidth conditions, the decoding of chunks according to such structures may introduce further delays. For instance, there are a significant amount of bits allocated to IDR frames when compared to non-IDR frames. When the client downshifts (e.g., based on reduced bandwidth and/or impending buffer underflow), transmitting such a "fat" IDR frame may take a considerable amount of time, which may place the client in a worse condition. A similar problem may arise when a client upshifts to a representation encoded in a higher bitrate.

To reduce the overall overhead of "fat" IDR frames, one may decide to use them less often. In other words, one encoding/delivery strategy may be to adopt a longer chunk (e.g., consisting of a long Group of Pictures or GoP, or multiples GoPs). If the network conditions are relatively stable, longer chunks on the order of 5-10 seconds may be satisfactorily used. However, in environments where network conditions may change frequently, a 10-second chunk, for instance, may not be very practical since it limits the granularity of up/downshifting. Further, using IDR frames at each chunk for such frequent transitions in bitrate may harm performance, as indicated above.

By using transition chunks, faster downshifting and upshifting is facilitated. Certain adaptive streaming embodiments and/or other features are described hereinafter in the context of an example computer network environment, with content embodied as video for the sake of facilitating an understanding of the disclosure. It should be appreciated that the principles described herein may be applied to other content (e.g., audio, data, graphics, images, etc.), in lieu of or in addition to video, and hence is also considered within the scope of the embodiments. Further, certain embodiments of adaptive streaming systems are described below in the context of adaptive streaming in an environment that uses the Hypertext Transfer Protocol (HTTP). HTTP is a request-response standard for client-server computing. In HTTP, Web browsers act as clients, while an application running on the computer hosting the Web site or content acts as a server. HTTP often uses the Transmission Control Protocol (TCP) that is part of the Internet Protocol (IP) suite of communications protocols used for the Internet and other similar networks. One having ordinary skill in the art should understand that other networks distributing multimedia (e.g., video, graphics, audio, and/or data, or otherwise referred to also herein individually or collectively as media content or simply, content) may also benefit from certain embodiments of adaptive streaming systems and methods and hence are contemplated to be within the scope of the disclosure. For instance, though described in the context of a pull-type streaming environment, similar issues may arise in push-based streaming methods, and hence, one or more embodiments of adaptive streaming systems disclosed herein may be applied to such applications. It should be understood by one having ordinary skill in the art that, though specifics for one or more embodiments are disclosed herein, such specifics as described are not necessarily part of every embodiment.

FIG. 1 is a schematic diagram of an example environment, a computer network 100, in which certain embodiments of adaptive streaming systems and methods may be implemented. It should be understood by one having ordinary skill in the art, in the context of the present disclosure, that the computer network 100 shown in FIG. 1 is merely illustrative, and should not be construed as implying any limitations upon the scope of the disclosure. The computer network 100 may comprise a plurality of individual networks, such as a wireless network and/or a wired network. The example computer network 100 depicted in FIG. 1 includes a plurality of client devices 102, 104, 105, and 106 (e.g., wired and/or wireless devices, such as cellular phones, personal digital assistants (PDAs), computer devices or systems such as laptops, personal computers, set-top terminals, televisions with communication capabilities, DVD/CD recorders, etc.) that are in communication with one or more server devices, such as an edge or cache server device 108, and/or one or more upstream devices, such as origin server device 114. The origin server device 114 is communicatively coupled to one or more encoding devices, such as encoding device 116. Additional servers may be employed in the computer network 100. The cache server device 108 is coupled to an upstream network, such as a wide area network (WAN) 112, which in one embodiment comprises the Internet. In some embodiments, the cache server device 108 may be coupled to the client devices 102, 104, 105, and 106 via a network, such as a local area network (LAN) or a WAN. Other networks are contemplated to be within the scope of the disclosure, including networks that use packets incorporated with other transport protocols or standards. The cache server device 108 and origin server device 114 may also comprise (e.g., be integrated with), or be in local communication with, one or more storage devices.

Communication between the cache server device 108 and the client devices 102, 104, 105, and/or 106 may be via wireless or wired connections, including by way of non-limiting example Ethernet, token ring, private or proprietary networks, among others. The cache server device 108 and/or origin server device 114 may comprise a server in an Internet Service Provider (ISP) facility, a private server, a gateway, and/or other devices or facilities used for communication of streaming video files (among other content, such as data, audio, etc.). One having ordinary skill in the art should understand that additional client devices, cache server devices, upstream server devices, and other devices, such as routers, bridges, etc., may be employed in the computer network 100. Communication of Internet Protocol (IP) packets between the client devices 102, 104, 105, and 106, the cache server device 108, and the origin server device 114 may be implemented according to one or more of a plurality of different protocols, including Transmission Control Protocol (TCP)/IP, among others.

The encoding device 116 is configured with one or more processors, such as processor 118, memory 120 configured with encoding logic (executable instructions or code) 122, and a communications (or network) interface (I/O) 126 to receive content streams for encoding and segmenting (chunking, such as into GoPs) and send encoded streams in the form of chunks of different bitrates to the origin server 114. In one embodiment, the communications interface 126 receives a digitized content stream (e.g., a video or audio/video stream, such as a movie, a live broadcast of a television show or sports or entertainment event, etc.), and the processor 118 is configured by the encoding logic 122 to encode the content stream at a plurality of encoded representations at different bitrates. For instance, one representation may comprise an encoded version of the received content stream at a bitrate of 5 Mbps, a second representation may comprise an encoded version of the received content stream at a bitrate of 3 Mbps, and a third representation may comprise a transition stream. A transition stream may be created for every possible transition between two bitrates, or a subset thereof, for either downshifts, upshifts, or a combination of both. For instance, if there are three representations (e.g., representations of a video stream encoded at different bitrates) of 10 Mbps, 5 Mbps, and 1 Mbps, the encoding device 116 may generate transition chunks for 10 Mbps-to-5 Mbps transitions, 10 Mbps-to-1 Mbps transitions, and 5 Mbps-to-1 Mbps transitions. A subset may only be a 10 Mbps-to-5 Mbps transition, or some other subset or collective combination of transition chunks based, for instance, on implementation, content, and/or network environment.

The processor 118 is further configured by the encoding logic 122 to segment each of the plural representations into chunks. Metadata (e.g., location (such as an URL) or identification of each chunk, chunk duration, bitrate, timestamp information, etc.) for all chunks of a given bitrate are listed in a manifest under a respective representation. The encoding device 116 provides the manifest (or in some embodiments, information used to assemble one elsewhere) and the chunks for the various representations via the communications interface 126 to the origin server device 114.

Although described in the context of encoding software or firmware logic 122 stored in memory 120, it should be understood to one having ordinary skill in the art that the encoding/chunking functionality may be separated among a plurality of modules, or in some embodiments, implemented using hardware or a combination of hardware and software/firmware.

Figure 2:
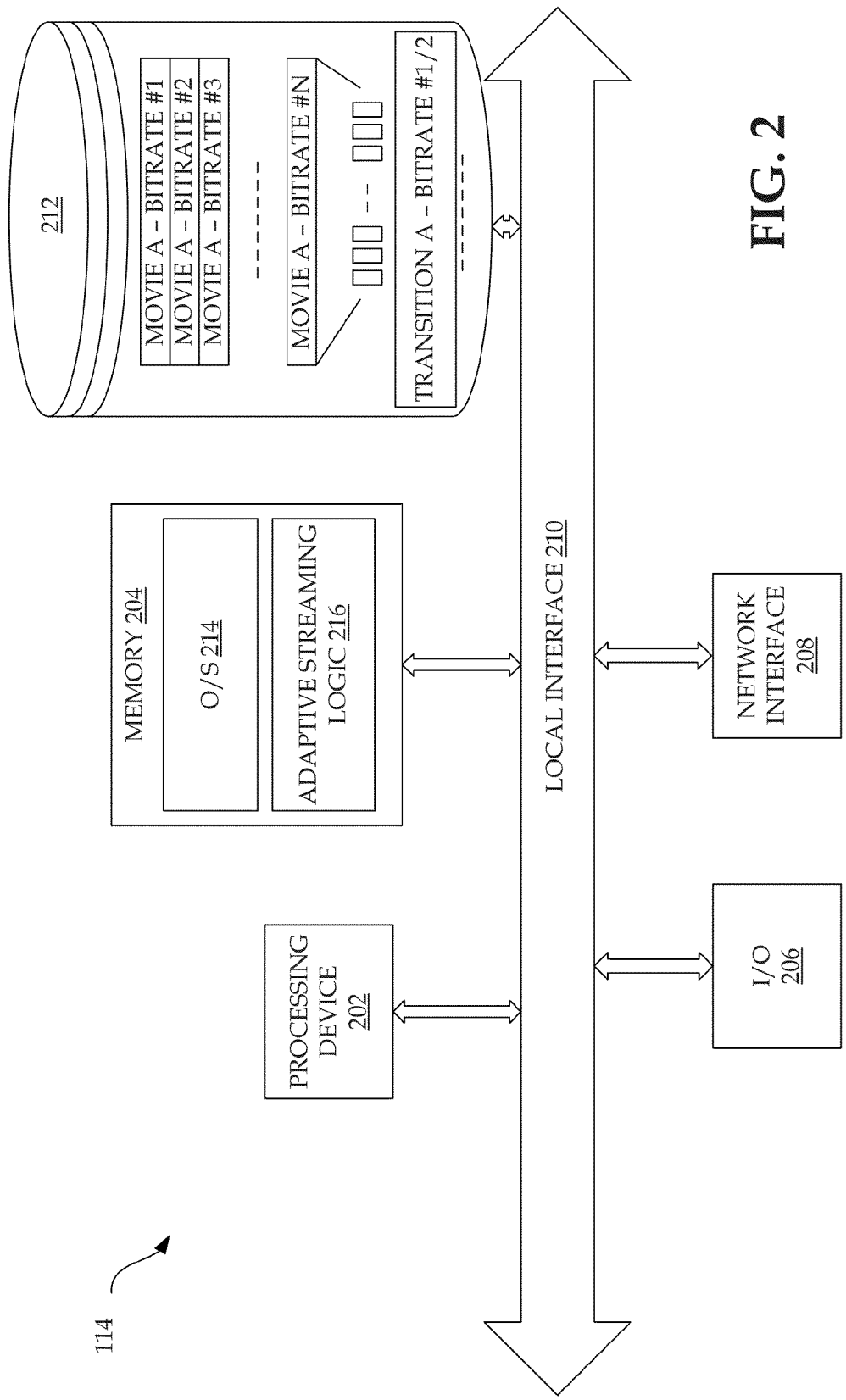
FIG. 2 is a block diagram of an embodiment of an example network device.

FIG. 2 is a block diagram of an embodiment of an example origin server device 114. It should be understood by one having ordinary skill in the art, in the context of the present disclosure, that the origin server device 114 shown in FIG. 2 is merely illustrative, and should not be construed as implying any limitations upon the scope of the disclosure. Generally, in terms of hardware architecture, the origin server device 114 includes a processing device 202, memory 204, input/output (I/O) devices 206, and network interface 208, each of which is communicatively coupled via a local interface 210. The processing device 202 is a hardware device for executing software, particularly that which is stored in memory 204. The processing device 202 may be any custom made or commercially available processor, a central processing unit (CPU), an auxiliary processor among several processors associated with the origin server device 114, a semiconductor-based microprocessor (in the form of a microchip or chip set) or generally any device for executing software instructions.

The network interface 208 includes one or more devices that communicate both inputs and outputs, for instance but not limited to, a modulator/demodulator (modem for accessing another device, system, or network), a radio frequency (RF) transceiver or other type of transceiver, a telephonic interface, a bridge, a router, etc.

The I/O devices 206 may include input devices, for example but are not limited to, a keyboard, mouse, scanner, microphone, etc. Furthermore, the I/O devices 206 may also include output devices, for example but not limited to, a printer, display, etc.

The local interface 210 may be, for example but not limited to, one or more buses or other wired or wireless connections, as is known in the art. The local interface 210 may have additional elements, which are omitted for simplicity, such as controllers, buffers (caches), drivers, repeaters, and receivers, to enable communications. Further, the local interface 210 may include address, control, and/or data connections to enable appropriate communications among the aforementioned components.

In one embodiment, the origin server device 114 is further configured with an integrated storage device 212 coupled to the local interface 210, the storage device 212 configured to store a plurality of content chunks received from the encoding device 116. In some embodiments, the storage device 212 may be externally coupled to the origin server device 114.

The memory 204 comprises a suitable operating system (O/S) 214 and adaptive streaming logic 216. The operating system 214 essentially controls the execution of other computer programs, such as the adaptive streaming logic 216, and provides scheduling, input-output control, file and data management, memory management, and communication control and related services. The adaptive streaming logic 216 comprises executable code to respond to client device requests for chunks (e.g., HTTP functionality), as well as a data structure corresponding to a fully or partially (yet continually updated) completed manifest that corresponds to the manifest sent by the encoding device 116. In some implementations, the manifest may not be complete, yet continually assembled and updated from the encoding device 116 (e.g., such as for live broadcasts).

The storage device 212 stores different representations of content in the form of chunks. For instance, using a movie as an example, the storage device 212 stores a first representation of Movie A at a first bitrate (e.g., bitrate #1), a second representation of Movie A at a second bitrate (e.g., bitrate #2), and so on. Further shown is a transition stream (for transition from bitrate #1 to bitrate #2, though other transition streams may be stored as explained above). Each representation is in the form of plural chunks at the given bitrate, as partially illustrated by the individual, shorter blocks for representation bitrate #N in FIG. 2 (and similarly applicable to the other representations). Each of the chunks, except for the transition chunks, is independently decodable, and each chunk generally lasts in duration from 2-10 seconds, though not limited to these durations. For each of these different bitrates, a corresponding representation with associated metadata is maintained in the manifest stored in memory 204. Note that additional content with corresponding representations in chunk format may be included in the storage device 212.

The adaptive streaming logic 216 is configured to send the manifest, or select portions thereof, to the client devices 102, 104, 105, and/or 106 (and/or to the cache server 108) either through an in-band or out-of-band connection. Using the client device 105 embodied as a set-top box as an example client device hereinafter (with the understanding that similar principles apply to the other client devices), in one embodiment, the client device 105 requests a chunk based on the listing of the manifest sent by the origin server device 114. The client device 105 is effectively requesting the chunk by bitrate. In some embodiments, the origin server device 114 further sends the manifest and referenced chunks to the cache server device 108 (or the cache serve device 108 may passively perform caching), facilitating rapid response to requests by other client devices in the computer network 100 and/or facilitating trick modes by the requesting client device 105. In some embodiment, for seeking-like functions, the conventional chunks (that start with an IDR frame) are provided to the client device 105. For continuous streaming and during downshifting (and upshifting), the transition chunks may be used to avoid the bitrate spikes, among other benefits.

The memory 204 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 204 may incorporate electronic, magnetic, optical, semi-conductive, and/or other types of storage media. Note that the memory 204 may have a distributed architecture, where various components are situated remotely from one another, which can be accessed by the processing device 202.

The software in memory 204 may include one or more separate programs, each of which comprises an ordered listing of executable instructions for implementing logical functions. In the embodiment shown in FIG. 2, the software in memory 210 includes the operating system 214 and the adaptive streaming logic 216, as explained above. Functionality of the adaptive streaming logic 216 may be implemented using a single module, or distributed among a plurality of modules.

When the adaptive streaming logic 216 is in operation, the processing device 202 is configured to execute the adaptive streaming logic 216 stored within the memory 204, to communicate data to and from the memory 204, and to generally control operations of the adaptive streaming logic 216. The adaptive streaming logic 216 and the O/S 214, in whole or in part, but typically the latter, are read by the processing device 202, perhaps buffered within the processing device 202, and then executed.

Figure 3:
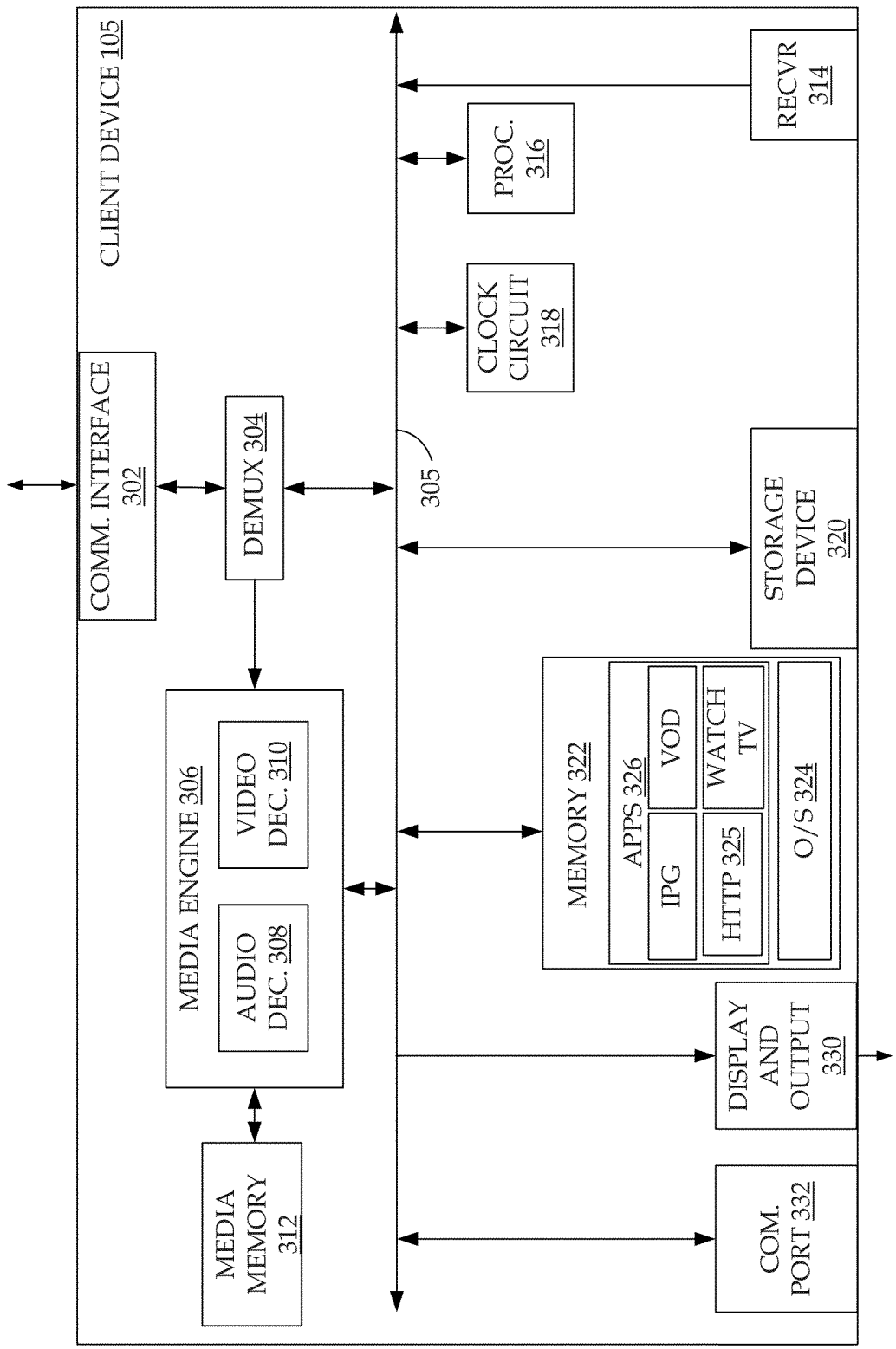
FIG. 3 is a block diagram of an embodiment of an example client device.

FIG. 3 is a block diagram that illustrates an embodiment of an example client device 105. It should be understood by one having ordinary skill in the art, in the context of the present disclosure, that the client device 105 shown in FIG. 3 is merely illustrative, and should not be construed as implying any limitations upon the scope of the disclosure. Similar functionality may be found in the client devices 102, 104, and 106. The client device 105 includes a communication interface 302 suitable for enabling communication (e.g., TCP/IP) with devices of the computer network 100, and for receiving a manifest (or information therein) as well as the requested chunks. For instance, the communication interface 302 may be of a type suitable for communication over an IP network, a coaxial cable network, an HFC network, and/or wireless network, among others. The communication interface 302 is coupled to a demultiplexer (herein, also demux) 304. The demux 304 is configured to parse the metadata (e.g., in the packet header) of the chunks and the body or payload data (the content, such as the sequence of video and/or audio frames). The metadata may include timestamp information, packet identifiers, program numbers, bitrate, and/or other information necessary to decode the received chunk. The chunk and metadata information is forwarded to or otherwise received by the media engine 306 as explained further below.

Although the client device 105 is described in the context of an Internet video streaming implementation, it should be appreciated by one having ordinary skill in the art that the client device 105 may comprise additional and/or different components in some embodiments. For instance, some embodiments of the client device 105 may include a tuner system (e.g., radio frequency tuning, not shown) coupled to the communication interface 302, the tuner system comprising one or more tuners for receiving transport streams received via the communication interface 302. Further, in some embodiments, a demodulator may be employed, such as to demodulate the received carrier signal, wherein the demux 304 is configured to parse the transport stream packets of one or more defined carrier frequencies.

The demux 304 is coupled to a bus 305 and to a media engine 306 (also known as an audio/video (A/V) processing or decoding device). The media engine 306 comprises, in one embodiment, decoding logic comprising one or more of a respective audio decoder 308 and video decoder 310, which decode (e.g., decompress and reconstruct) the chunks received via the communications interface 302. When the chunks are played back, the original content stream is reconstructed in a seamless fashion. The client device 105 dynamically requests and receives the chunks. The client device 102 can adapt its content consumption rate according to the available receive bandwidth it observes.

The media engine 306 further comprises buffer management functionality to facilitate (e.g., in cooperation with HTTP logic 325) a determination as to the need for switching down or upshifting to a different bitrate to satisfy buffer operation. The media engine 306 is further coupled to the bus 305 and to media memory 312, which in one embodiment comprises one or more buffers for temporarily storing compressed and/or reconstructed pictures and/or audio frames. In some embodiments, the buffers of the media memory 312 and/or other buffers (e.g., network buffers) may reside in other memory (e.g., memory 322, explained below), or distributed among media memory 312 and memory 322.

The client device 105 comprises additional components coupled to bus 305. For instance, the client device 105 further comprises a receiver 314 configured to receive user input (e.g., via direct-physical or wireless connection via a keyboard, remote control, voice activation, etc.) to convey a user's request or command (e.g., for program selection, stream manipulation such as fast forward, rewind, pause, channel change, etc.), one or more processors (one shown) 316 for controlling operations of the client device 105, and a clock circuit 318 comprising phase and/or frequency locked-loop circuitry (or software, or combination of hardware and software) to lock into system clock information received in an audio, video, or A/V stream to facilitate decoding operations and to clock the output of reconstructed audiovisual content.

The client device 105 further comprises, in one embodiment, a storage device 320 (and associated control logic) to temporarily store buffered content and/or to more permanently store recorded content. Memory 322 in the client device 105 comprises volatile and/or non-volatile memory, and is configured to store executable instructions or code associated with an operating system (O/S) 324, and one or more applications 326 (e.g., interactive programming guide (IPG), video-on-demand (VoD), WatchTV (associated with broadcast network TV), HTTP logic 325, among other applications such as pay-per-view, music, personal video recording (PVR), driver software, etc.). The HTTP logic 325 comprises HTTP functionality, and may generate requests for chunks based in some embodiments on a manifest (e.g., bitrate) received from the network 100 (e.g., from the origin server device 114 and/or the cache server device 108). Decisions by the HTTP logic 325 to switch up or down (or maintain) the current bitrate may be based on feedback from the media engine 306 (e.g., buffer levels, as explained above) and monitored bandwidth constraints. For instance, the HTTP logic 325 may monitor and hence ascertain that the client device 105 is routinely receiving chunks late, which suggests bandwidth constraints for the current bitrate (and hence a need to downshift to a lower bitrate). The HTTP logic 325 stores the received manifest (or information included therein), and hence is aware of the available bitrates for chunks stored at the origin server device 114. Switching among different representations (e.g., to different bitrates) is thus enabled through the use of the information in the manifest.

Although depicted as software, functionality of the HTTP logic 325 may in some embodiments be configured in hardware, or a combination of hardware and software.

The client device 105 is further configured with the display and output logic 330, as indicated above, which includes graphics and video processing pipelines, among other circuitry, as known in the art to process the decoded pictures and associated audio and provide for presentation (e.g., display) on, or associated with, a display device or other media device. A communications port 332 (or ports) is further included in the client device 105 for receiving information from and transmitting information to other devices. For instance, the communication port 332 may feature USB (Universal Serial Bus), Ethernet, IEEE-1394, serial, and/or parallel ports, etc. In addition, the communications port 332 may be configured for home networks (e.g., HPNA/MoCA, etc.). The client device 105 may also include an analog video input port for receiving analog video signals.

One having ordinary skill in the art should understand in the context of the present disclosure that the client device 105 may include other components not shown, including a compression engine, memory, decryptors, samplers, digitizers (e.g., analog-to-digital converters), multiplexers, conditional access processor and/or application software, driver software, Internet browser, among others. Further, though the HTTP logic 325 is illustrated as residing in memory 322, it should be understood that in some embodiments, the HTTP logic 325 may be incorporated in the media engine 306, or elsewhere, such as in the O/S 324, among other locations or in conjunction with other logic of the client device 105. Similarly, in some embodiments, functionality for one or more of the components illustrated in, or described in association with, FIG. 3 may be combined with another component into a single integrated component or device.

Certain embodiments of an adaptive streaming system may encompass all or part of one or a combination of the following: the encoding device 116, the cache server 108, the origin server 114, or one or more client devices 102, 104, 105, and/or 106.

The HTTP logic 325, the media engine 306, the encoding logic 122, and/or the adaptive streaming logic 216 of certain embodiments of the present disclosure can be implemented in hardware, software, firmware, or a combination thereof. In embodiments where the HTTP logic 325, the media engine 306, the encoding logic 122, and/or the adaptive streaming logic 216 are implemented in software or firmware (collectively, software code or software logic or simply logic), such embodiments are stored in memory and executed by a suitable instruction execution system. When the HTTP logic 325, the media engine 306, the encoding logic 122, and/or the adaptive streaming logic 216 are implemented in software, it should be noted that the HTTP logic 325, the media engine 306, the encoding logic 122, and/or the adaptive streaming logic 216 may be stored on any computer readable medium for use by or in connection with any computer related system or method. In the context of this document, a computer readable medium is an electronic, magnetic, optical, semiconductive, or other physical device or means that can contain or store a computer program for use by or in connection with a computer related system or method. The HTTP logic 325, the media engine 306, the encoding logic 122, and/or the adaptive streaming logic 216 may be embodied in any non-transitory computer-readable medium for use by or in connection with an instruction execution system, apparatus, or device, such as a computer-based system, processor-containing system, or other system that can fetch the instructions from the instruction execution system, apparatus, or device and execute the instructions.

In embodiments where all or a portion of the functionality of the HTTP logic 325, the media engine 306, the encoding logic 122, and/or the adaptive streaming logic 216 are implemented in hardware, such functionality of the HTTP logic 325, the media engine 306, the encoding logic 122, and/or the adaptive streaming logic 216 may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 4:
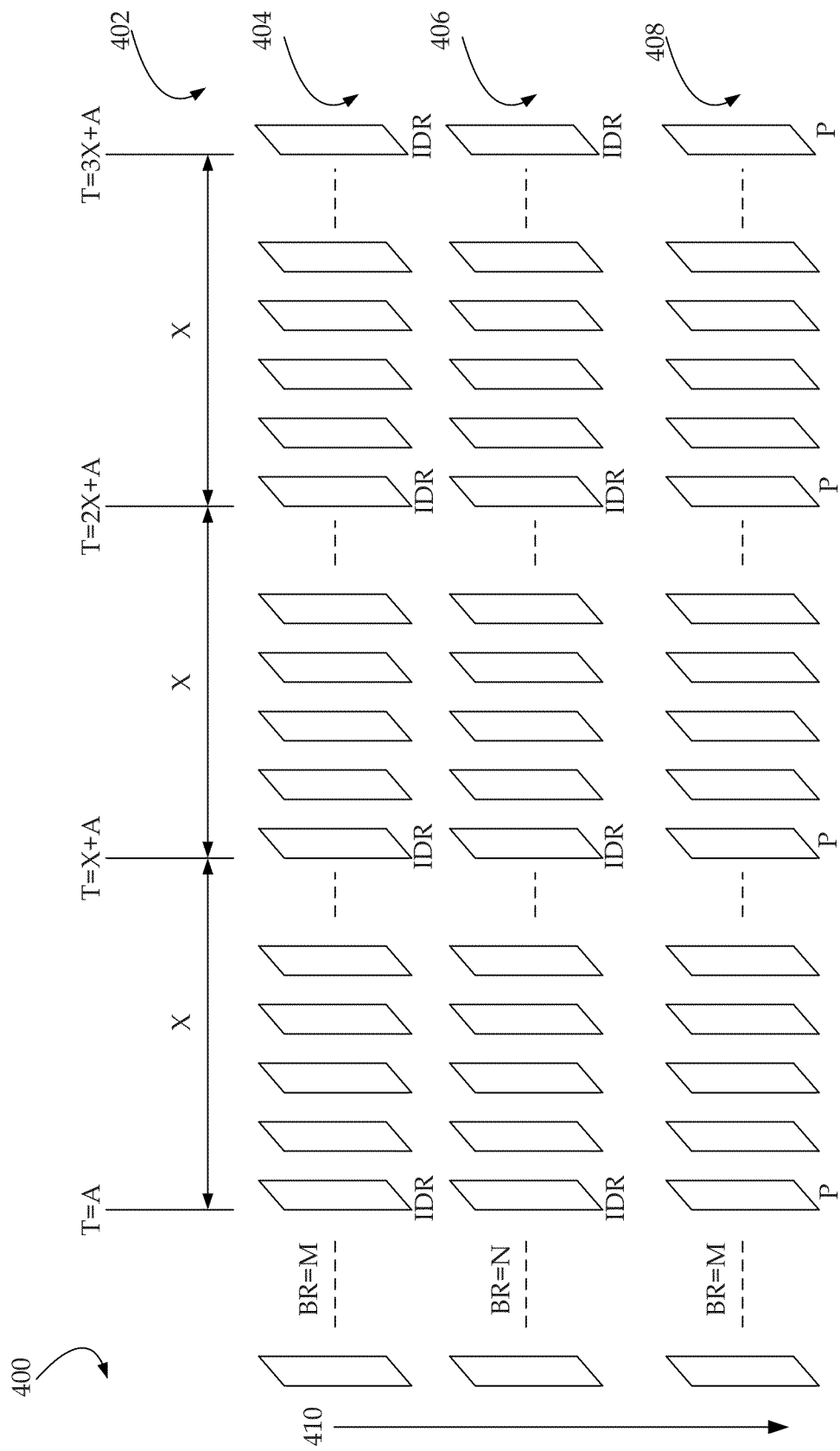
FIG. 4 is a schematic diagram that illustrates the provision of two representations of a content stream and a transition stream based on one of the two representations.

Referring now to FIG. 4, shown is a schematic diagram 400 that illustrates one embodiment where transition chunks are provided along with chunks from other representations of a video stream. The diagram 400 includes a time axis 402 beginning, arbitrarily, at time equals A (e.g., A=0), a first representation 404 having plural chunks, each chunk of duration "X" and encoded at a bitrate (BR) of M (e.g., M=3 Mbps, though other values may be used), a second representation 406 having plural chunks, each chunk of duration "X," encoded at a bitrate of N (e.g., N=5 Mbps, though other values may be used), and a third representation 408, the latter corresponding to a transition stream having chunks each of duration "X" and encoded at a bitrate of M (e.g., the bitrate of the first representation). Each chunk comprises plural, successive frames of a sequence. As depicted in FIG. 4, the first frame (in decode order) for each chunk (of length "X") for the first 404 and second 406 representations is an IDR frame. On the other hand, the first frame in each chunk of the transition stream 408 is a non-IDR frame (e.g., predictive frame, though in some embodiments, other non-IDR frames may be used). The predictive frame of each chunk is based on one or more interdependencies with one or more reference frames from the first representation 402, as represented by single-headed arrow 410.

In operation, and assuming for illustrative purposes that the first representation 404 comprises a 3 Mbps video stream, the second representation 406 comprises a 5 Mbps video stream, and the third representation 408 comprises a transition from 5 Mbps to 3 Mbps, the 3 Mbps and 5 Mbps chunks of representations 404 and 406 are each of "X" second duration, and are encoded independently (and hence independently decodable). Assume the duration of each chunk ("X") is two (2) seconds. The encoding device 116 generates the 3 and 5 Mbps chunks, as well as the 5-to-3 transition chunks of the third representation 408. In one embodiment, the 5-to-3 transition chunks are encoded at 3 Mbps on average. As explained generally above, the 5-to-3 transition chunk is used when the client device 105 switches from 5 Mbps representation to 3 Mbps representation. The 5-to-3 transition chunk does not start with an IDR frame, but rather, with a non-IDR frame (e.g., predictive frame, or an Intra-coded (I) frame, the latter enabling the 5-to-3 transition chunk to refer to the previous chunk from the 5 Mbps representation) that facilitates the transition. It should be noted that the stream generated by concatenating the 5-to-3 transition chunks is not a compliant stream (e.g., cannot be decoded by a reference decoder), since the frames in a 5-to-3 transition chunk that starts at time equals A are predictively encoded based on the frames in the 5 Mbps chunk that starts at time=A−X.

When the client device 105 wants to transition to a new representation (e.g., from 5 Mbps to 3 Mbps), the client device 105 (e.g., HTTP logic 325) requests the 5-to-3 transition chunk at the desired boundary. After this chunk, the client device 105 continues requesting the regular 3 Mbps chunks (not the 5-to-3 transition chunks). In other words, in one embodiment, the transition chunks are only used when the client device 105 makes a transition from one representation to another. Hence, though conventional systems provide two (e.g., 3 and 5 Mbps) representations, certain embodiments of the adaptive streaming system provide three (e.g., 3 and 5 Mbps and the 5-to-3) representations.

Note that in certain implementations, drift error may be introduced (e.g., due to bitrate mismatch). One solution is to avoid the drift error by introducing more frequent (e.g., as needed) intra-coded macroblocks, which is consistent with at least some goals of avoiding bandwidth spikes and/or improving timely delivery of the frames. The use of more frequent intra-coded updates (e.g., intra-refresh) may enable quick containment of any drift errors. The drift error is eliminated entirely at the next chunk since the next chunk likely starts with an IDR frame.

Note that in some embodiments, if back-to-back downshifting occurs, use of the transition chunk may be limited (e.g., only for the first transition or for a limited amount of transitions).

Figure 5:
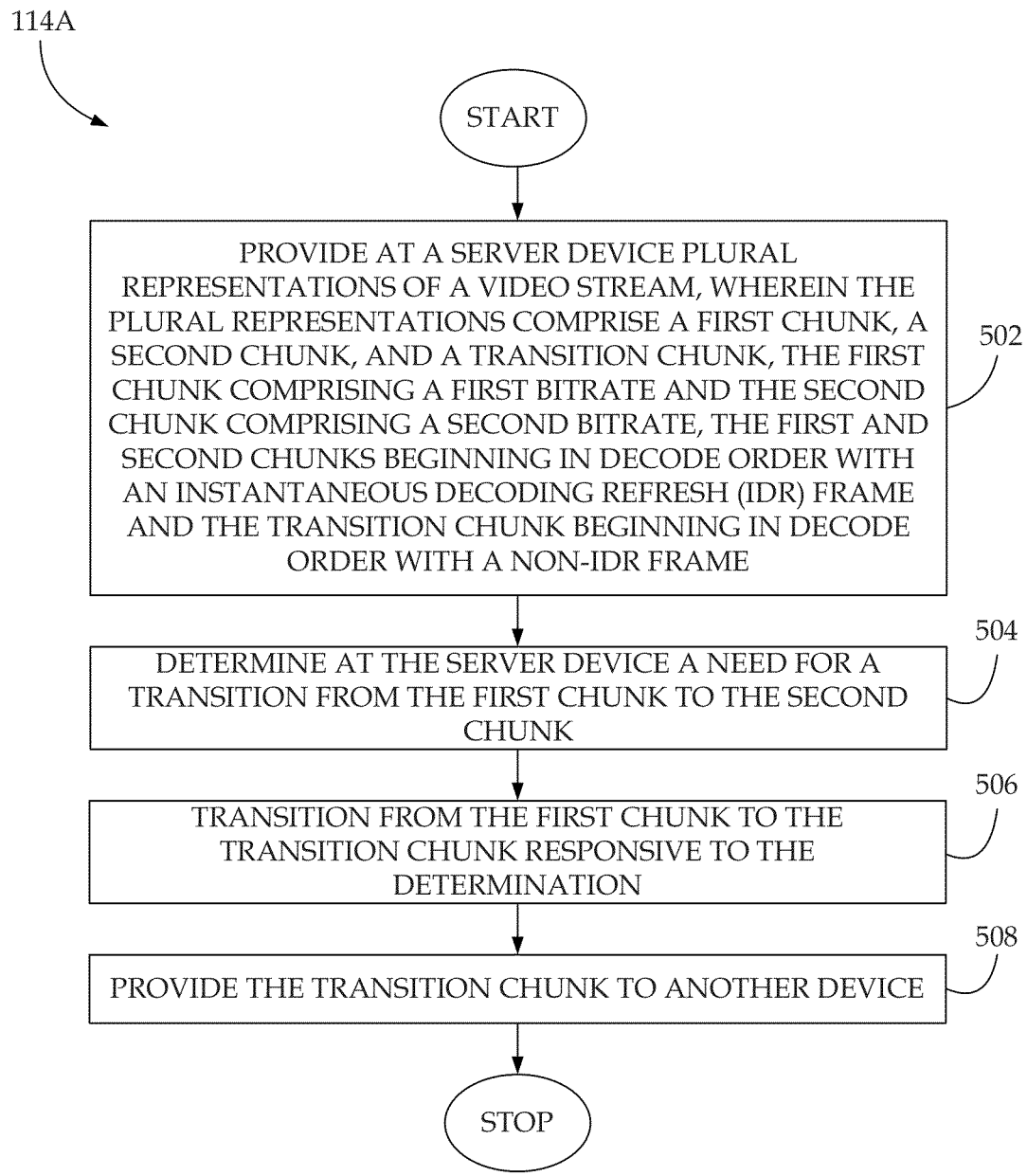
FIG. 5 is a flow diagram that illustrates an embodiment of an example method for providing a transition chunk in response to a request to transition from a first representation to a second representation.

Having described various components of certain embodiments of adaptive streaming systems, it should be appreciated that one method embodiment 114A implemented, for example, by the server device 114 or by the cache server device 108 and illustrated in FIG. 5, comprises providing at a server device plural representations of a video stream, wherein the plural representations comprise a first chunk, a second chunk, and a transition chunk, the first chunk comprising a first bitrate and the second chunk comprising a second bitrate, the first and second chunks beginning in decode order with an instantaneous decoding refresh (IDR) frame and the transition chunk beginning in decode order with a non-IDR frame (502); determining at the server device a need for a transition from the first chunk to the second chunk (504) possibly based on some state information; transitioning from the first chunk to the transition chunk responsive to the determination (506); and providing the transition chunk to another device (508).

Figure 6:
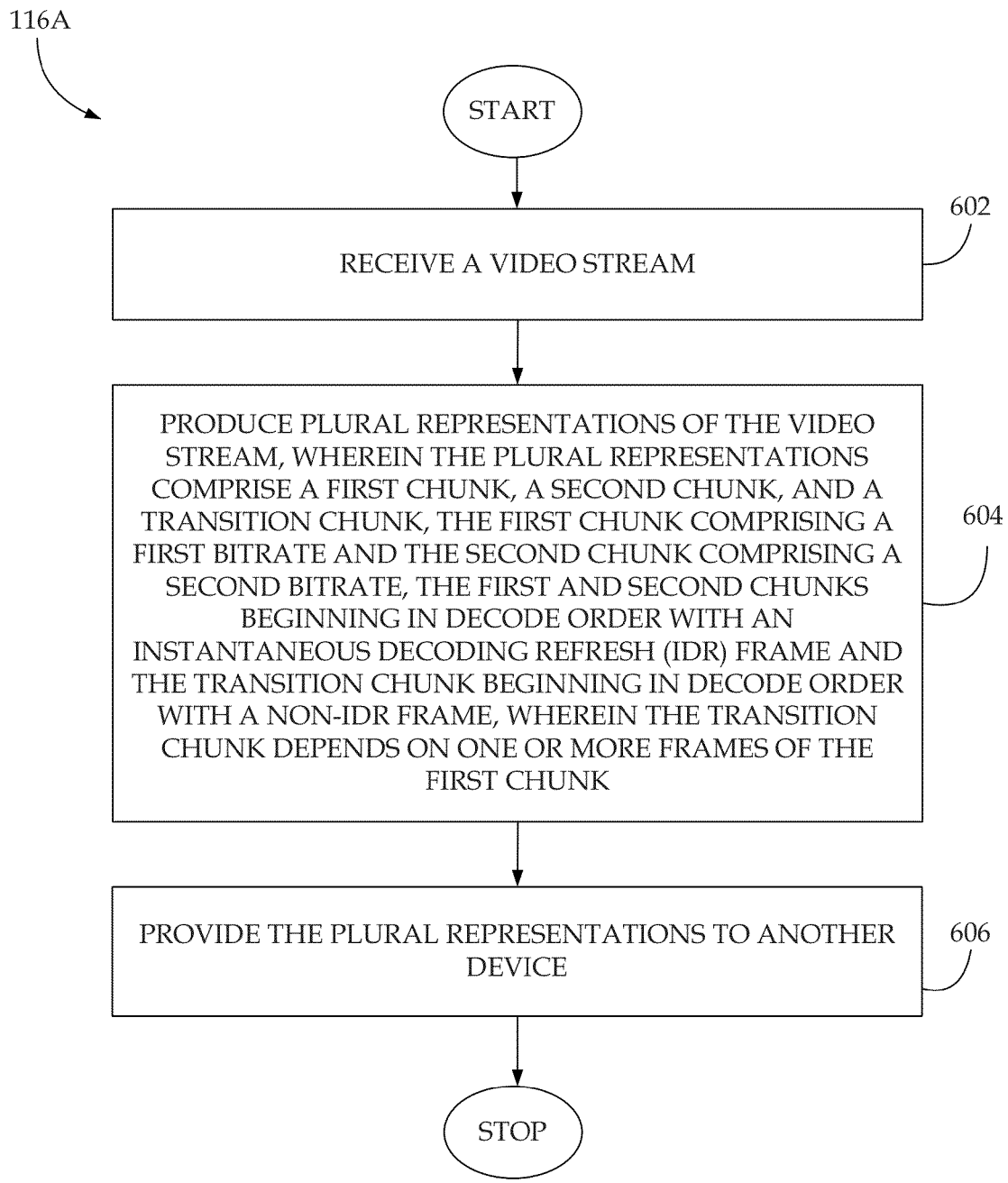
FIG. 6 is a flow diagram that illustrates an embodiment of an example method for generating a plurality of representations of a content stream, including chunks pertaining to each stream a transition stream comprising plural transition chunks.

It should be appreciated that another method embodiment 116A implemented by the encoding device 116 and illustrated in FIG. 6, comprises receiving a video stream (602); producing plural representations of the video stream, wherein the plural representations comprise a first chunk, a second chunk, and a transition chunk, the first chunk comprising a first bitrate and the second chunk comprising a second bitrate, the first and second chunks beginning in decode order with an instantaneous decoding refresh (IDR) frame and the transition chunk beginning in decode order with a non-IDR frame, wherein the transition chunk depends on one or more frames of the first chunk (604); and providing the plural representations to another device (606).

Figure 7:
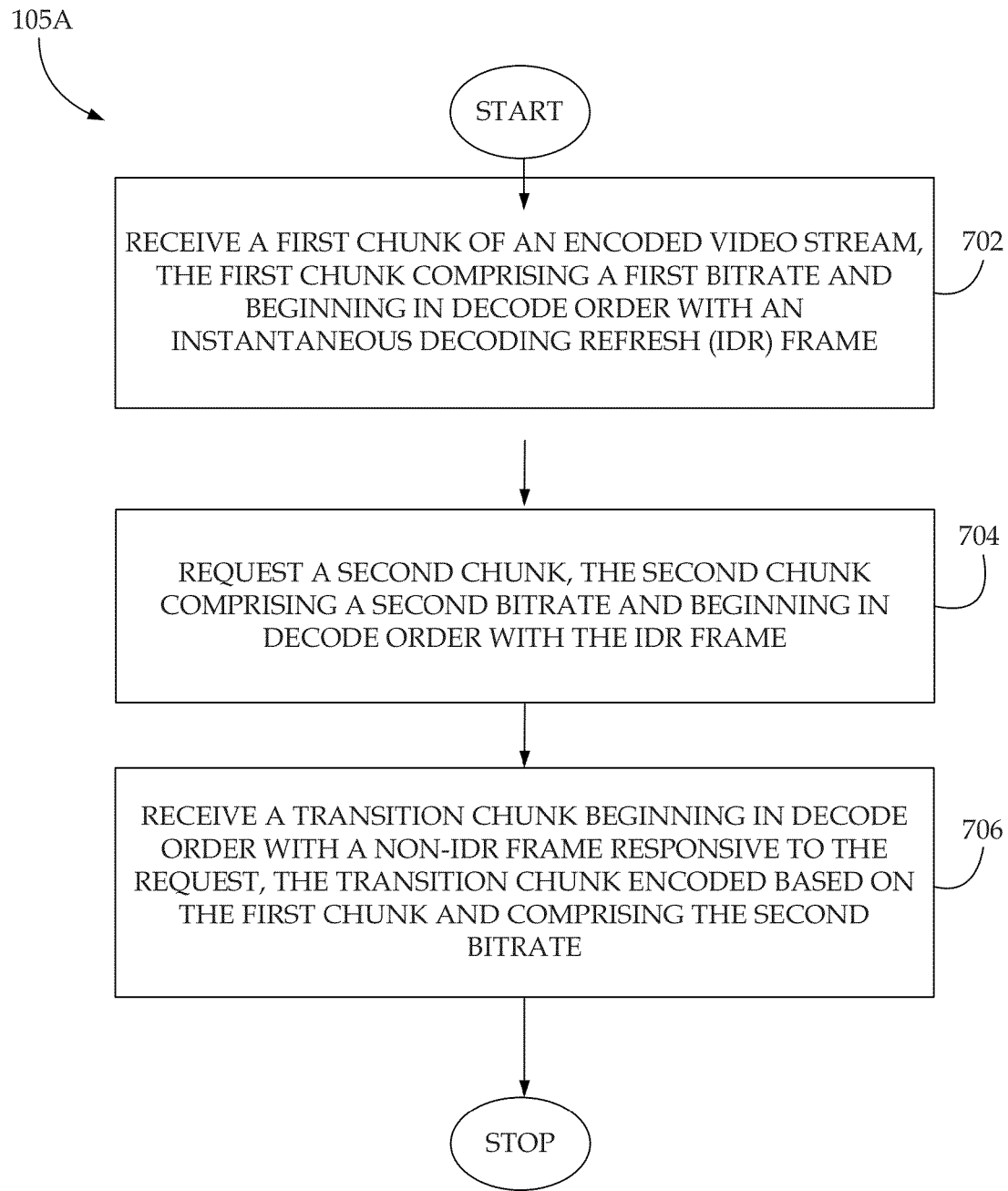
FIG. 7 is a flow diagram that illustrates an embodiment of an example method for receiving a transition chunk responsive to requesting a second chunk at one bitrate while receiving a first chunk at another bitrate.

It should be appreciated that another method embodiment 105A implemented by a client device (e.g., the client device 105) and illustrated in FIG. 7, comprises receiving a first chunk of an encoded video stream, the first chunk comprising a first bitrate and beginning in decode order with an instantaneous decoding refresh (IDR) frame (702); requesting a second chunk, the second chunk comprising a second bitrate and beginning in decode order with the IDR frame (704); receiving a transition chunk beginning in decode order with a non-IDR frame responsive to the request, the transition chunk encoded based on the first chunk and comprising the second bitrate (706).

Any process descriptions or blocks in flow charts should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art. In some embodiments, steps of a process identified in FIGS. 5-7 using separate boxes can be combined.

In addition, though the various flow diagrams (e.g., shown in FIGS. 5-7) are shown and described in the context of the architectures shown and described in FIGS. 1-3, it should be understood that implementation of the methods described in FIGS. 5-7 are not limited to those architectures, and that the same devices or other processing devices possessing different architectures configured to implement such methods are contemplated to be within the scope of the disclosure.

It should be emphasized that the above-described embodiments of the present disclosure are merely possible examples of implementations, merely set forth for a clear understanding of the principles of the adaptive streaming systems and methods. Many variations and modifications may be made to the above-described embodiment(s) without departing substantially from the spirit and principles of the disclosure. These and other modifications and variations are intended to be included herein within the scope of this disclosure and protected by the following claims.

What is claimed is:

1. A method comprising:
providing at a server device plural representations of a data stream, wherein the plural representations comprise a first chunk, a second chunk, and a transition chunk, the first chunk comprising a first bitrate and the second chunk comprising a second bitrate, the first and second chunks beginning in decode order with an instantaneous decoding refresh (IDR) frame and the transition chunk beginning in decode order with a non-IDR frame, the transition chunk encoded based on frames from the first chunk and comprising the second bitrate;
receiving a request to transition from the first chunk to the second chunk;
transitioning from the first chunk to the transition chunk responsive to the request; and
providing the transition chunk to another device.

2. The method of claim 1, further comprising:
receiving from an encoding device an encoded and chunked first stream, an encoded and chunked second stream, and an encoded and chunked transition stream, wherein the encoded and chunked first, second, and transition streams comprise the first, second, and transition chunks, respectively.

3. The method of claim 1, wherein the transition chunk is encoded at a bitrate higher than the second bitrate.

4. The method of claim 1, wherein the transition chunk is encoded at a bitrate lower than or equal to the second bitrate.

5. The method of claim 1, wherein providing plural representations of the data stream comprises providing plural representations of the data stream comprising video data.

6. The method of claim 1, wherein providing the plural representations comprises providing the transition chunk for every possible transition in bitrate among the plural representations.

7. The method of claim 1, wherein providing the plural representations comprises providing the transition chunk for less than every possible transition in bitrate among the plural representations.

8. The method of claim 1, further comprising:
receiving a second request for a chunk corresponding to the plural representations that comprise the second chunk, the second request following the first request with no intermediary request for a chunk; and
responsive to receiving the second request, providing a chunk of the same bitrate as the second chunk and comprising at the beginning in decode order an IDR frame.

9. The method of claim 8, further comprising:
receiving a third request for a chunk corresponding to the plural representations that comprise the first chunk, the third request following the second request with no intermediary request for a chunk; and
responsive to receiving the third request, providing a second transition chunk comprising at the beginning in decode order a non-IDR frame if the third request specifies a bitrate different than the bitrate of the second chunk.

10. The method of claim 1, wherein the first bitrate is either greater than the second bitrate or less than the second bitrate.

11. The method of claim 1, wherein the non-IDR frame is a predictive frame.

12. An encoding device, comprising:
a memory comprising logic; and
a processor configured by the logic to:
receive at the encoding device a video stream;
produce plural representations of the video stream, wherein the plural representations comprise a first chunk, a second chunk, and a transition chunk, the first chunk comprising a first bitrate and the second chunk comprising a second bitrate, the first and second chunks beginning in decode order with an instantaneous decoding refresh (IDR) frame and the transition chunk beginning in decode order with a non-IDR frame, wherein the transition chunk depends on one or more frames of the first chunk and comprising the second bitrate; and
provide the plural representations to another device.

13. The encoding device of claim 12, wherein the plural representations each comprises chunked and encoded versions of the video stream.

14. The encoding device of claim 12, wherein the first bitrate is either greater than the second bitrate or less than the second bitrate.

15. The encoding device of claim 12, wherein the non-IDR frame is a predictive frame.

16. A client device, comprising:
a memory comprising logic; and
a processor configured by the logic to:
receive a first chunk of an encoded video stream, the first chunk comprising a first bitrate and beginning in decode order with an instantaneous decoding refresh (IDR) frame;
request a second chunk, the second chunk comprising a second bitrate and beginning in decode order with an IDR frame;
receive a transition chunk beginning in decode order with a non-IDR frame responsive to the request, the transition chunk encoded based on frames of the first chunk and comprising the second bitrate.

17. The client device of claim 16, wherein the first bitrate is either greater than the second bitrate or less than the second bitrate.

18. The client device of claim 16, wherein the non-IDR frame is a predictive frame.

* * * * *